United States Patent [19]

Lamboo

[11] 4,365,335
[45] Dec. 21, 1982

[54] GAS DISCHARGE LASER DEVICE

[75] Inventor: Theodorus F. Lamboo, Eindhoven, Netherlands

[73] Assignee: U.S. Philips Corporation, New York, N.Y.

[21] Appl. No.: 183,866

[22] Filed: Sep. 4, 1980

Related U.S. Application Data

[63] Continuation of Ser. No. 834,244, Sep. 19, 1977, abandoned.

[30] Foreign Application Priority Data

Jul. 28, 1977 [NL] Netherlands ........................ 7708349

[51] Int. Cl.³ ............................ H01S 3/04; H01S 3/03
[52] U.S. Cl. ........................................ 372/34; 372/61; 372/107
[58] Field of Search ............... 331/94.5 D, 94.5 G, 331/94.5 P, 94.5 PE; 372/33, 34, 36, 55, 61, 107

[56] References Cited

U.S. PATENT DOCUMENTS

| | | | |
|---|---|---|---|
| 3,739,297 | 6/1973 | Mark | 331/94.5 D |
| 3,784,927 | 1/1974 | Rudolph | 331/94.5 D |
| 3,875,530 | 4/1975 | Manoukian | 331/94.5 D |
| 3,878,479 | 4/1975 | Heising | 331/94.5 D |
| 3,916,336 | 10/1975 | Kaiser | 331/94.5 D |
| 4,045,129 | 8/1977 | Hamar | 331/94.5 D |

*Primary Examiner*—William D. Larkins
*Attorney, Agent, or Firm*—Robert T. Mayer; Bernard Franzblau

[57] ABSTRACT

By surrounding a gas discharge laser, which comprises a cylindrical glass envelope provided at two ends with laser mirrors which together constitute an optical resonator, at least partly and substantially coaxially with a sheath which is secured around the envelope by means of very slack resilient elements, for example rubber blocks or metal springs, varying temperature gradients in the envelope as a result of the gas discharge are substantially prevented so that the initial alignment of the laser beam does not vary substantially.

11 Claims, 1 Drawing Figure

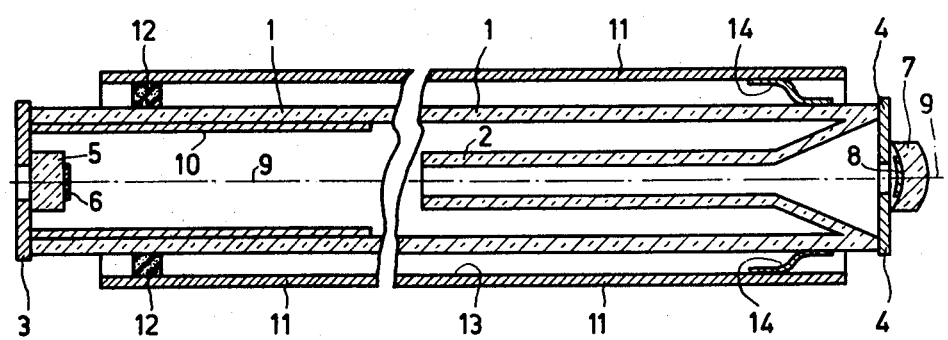

GAS DISCHARGE LASER DEVICE

This is a continuation of application Ser. No. 834,244, filed Sept. 19, 1977, now abandoned.

The invention relates to a gas discharge laser device comprising an at least partly cylindrical glass envelope, a laser tube and two laser mirrors which close the envelope and the optical axis of which coincides with the axis of the laser tube.

Such a gas discharge laser device of the coaxial type is known from German Offenlegungsschrift No. 25 06 707 in which the laser tube is situated in the glass envelope.

Gas discharge laser devices are also known in which the laser tube is also a part of the envelope, for example, as described in German Patent Specification No. 1,564,750. Moreover, in the last mentioned Patent Specification a laser is described wherein the laser tube is closed by Brewster windows and in which the laser mirrors are not connected directly to the laser tube. In order to prevent the thermal energy of the discharge from exerting an influence on the support of the laser mirrors, so that the adjustment of the mirrors would be adversely influenced, an envelope shielding against the thermal energy originating from the laser tube is provided around said support. In such a gas discharge laser device the mirrors may remain well positioned but the laser tube will move continuously due to varying temperature gradients in said laser tube so that the position, direction and hence possibly also the intensity of the generated laser beam will vary continuously.

In gas discharge lasers of the coaxial or capillary type in which the laser mirrors are placed directly on the ends of the laser tube or the envelope, the laser mirrors are also rotated relative to each other as a result of the said twisting movement of the laser tube, as a result of which the laser beam is displaced and the beam intensity may vary dependent on said displacement.

It is an object of the invention to provide a solution to the aforesaid thermal problems such that the movement of the laser tube and/or the envelope as a result of temperature gradients therein is/are substantially avoided during operation of the laser device.

A gas discharge laser device of the kind mentioned in the preamble is characterized according to the invention in that the glass envelope is surrounded at least partly and substantially coaxially by a metal sheath which is connected around the envelope by means of very slack resilient elements.

The laser may be of the coaxial type, in which the laser tube is surrounded at least partly by the envelope, or of the capillary type, in which the laser tube forms a part of the envelope.

The invention is based on the recognition obtained by experiments that, if a sheath is mounted around the envelope and/or the laser tube by means of very slack resilient elements in a manner such that deformations of the sheath do not exert any, i.e. a negligible, mechanical influence on the envelope and/or the laser tube, the said sheath substantially prevents varying temperature gradients in the envelope and/or the laser tube. As a result of the good thermal conductivity of the sheath, locally occurring temperature differences are rapidly compensated for. In the said German Patent Specification No. 1,564,750, the envelope surrounding the support of the laser mirrors only results in a thermal screening with respect to the laser tube, so that the support does not become very warm and will not expand so much. The slack resilient elements for the suspension of the sheath in a laser according to the invention may be, for example, slack metal springs or very readily compressible rubber blocks (for example, of foamed rubber).

The metal sheath is preferably manufactured from a seamless tube section.

By blackening the sheath on the inside for thermal radiation, an even better and more rapid compensation of thermal differences occurs.

By blackening the sheath also on the outside for thermal radiation, superheating of the sheath is prevented. In some cases, dependent on the use, it may also be attractive to cover the outside of the sheath with insulating material.

The sheath is preferably manufactured from aluminium which, for example, is provided on the inside with a black layer of aluminium or is roughened.

The invention will now be described in greater detail with reference to the accompanying drawing.

The FIGURE shows a sectional view of a laser device of the coaxial type according to the invention. A laser tube 2 is provided coaxially in a tubular envelope 1, which tubular envelope is provided at the two ends with metal plates 3 and 4. Provided on the metal plate 3 is a flat multi-layer mirror consisting of a glass substrate 5 with the multi-layer system 6 supported thereon. A concave multi-layer mirror consisting of the substrate 7 with the multi-layer system 8 supported thereon is provided on the metal plate 4. The optical axis 9 of the two mirrors should always coincide substantially with the axis of the laser tube 2. A cathode 10 is provided in the envelope 1. Plate 4 serves as the anode. Between the said cathode and anode a gas discharge is generated in the gas present in the laser. The system of mirrors constitutes an optical resonator in which a laser beam is generated by stimulated emission. As a result of the gas discharge, the envelope becomes warm and expands, so that the already described twisting movement of the laser tube and/or the envelope would occur in the case where the invention to be described was not used. An aluminium sheath 11 manufactured from seamless aluminium tube is provided according to the invention around the envelope 1. In this case the sheath has a wall thickness of 0.5 mm. The distance between the sheath and the envelope, i.e. the width of the air gap, in this case is approximately 1.5 mm. The sheath is blackened on the inside 13 so as to obtain a good heat absorption. The sheath 11 is provided coaxially around the envelope 1 by means of foamed rubber blocks 12 and/or slack metal springs 14 so that deformations of the sheath do not exert any influence on the laser. The coaxial metal sheath 11 thus provides a symmetrical substantially uniform annular air gap between the sheath and the tubular glass envelope 1 which promotes a uniform transfer of heat to the sheath along the longitudinal axis 9 of the laser tube. In this case the slack springs are spotwelded to the sheath. However, it is alternatively possible for the springs to form part of the suspension braces used to position and secure the laser in a holder. Locally occurring temperature differences are compensated for by the sheath. The sheath should be provided substantially coaxially around the envelope. A non-coaxial positioning of the sheath and the envelope would result again in the said twisting movement.

What is claimed is:

1. A gas discharge laser device comprising a tubular glass envelope, a laser tube coaxial with the tubular envelope, a pair of spaced apart laser mirrors sealing opposite ends of the tubular envelope and disposed to form an optical resonator having an optical axis which coincides with the axis of the laser tube, a metal sheath at least partly surrounding and coaxial with the tubular envelope, and means including a slack resilient element having a low coefficient of elasticity for supporting the metal sheath around the tubular glass envelope in good heat transfer relationship therewith so as to provide a substantially uniform heat transfer from the glass envelope to the metal sheath sufficient to substantially prevent the occurrence of varying temperature gradients along substantially the entire length of the laser tube such that a thermally induced deformation of the metal sheath exerts a negligible mechanical influence on the laser tube.

2. A gas discharge laser device as claimed in claim 1 wherein the metal sheath comprises a tube and the laser device further comprises a tubular cathode electrode disposed within the tubular envelope and an anode electrode spaced apart from said cathode electrode and situated near one end of the tubular envelope.

3. A gas discharge laser device as claimed in claim 1 wherein said supporting means includes one or more slack metal springs for mounting the metal sheath on the tubular glass envelope.

4. A gas discharge laser device comprising an at least partly cylindrical glass envelope, a laser tube, two spaced apart laser mirrors which close the ends of the envelope, the optical axis of the mirrors being coincident with the axis of the laser tube, a metal sheath having a black layer for thermal radiation coated on the inside surface thereof and at least partly surrounding the glass envelope and substantially coaxial therewith, and means including a plurality of very slack resilient elements for connecting the metal sheath around the envelope.

5. A gas discharge laser device comprising an at least partly tubular glass envelope, a laser tube coaxial with and located within said tubular envelope and containing a lasing gas, a pair of spaced apart mirrors adjacent the ends of the tubular envelope and disposed to form an optical resonator having an optical axis that coincides with the longitudinal axis of the laser tube, an elongated metal sheath having good thermal conductivity at least partly surrounding and coaxial with the tubular envelope to provide a symmetrical substantially uniform annular air gap between the metal sheath and the tubular glass envelope and in good heat transfer relationship therewith sufficient to substantially prevent the occurrence of varying temperature gradients along substantially the entire length of the laser tube, and means including at least one very slack resilient element for resiliently supporting the metal sheath around the tubular glass envelope such that a thermally induced deformation of the metal sheath exerts a negligible mechanical influence on the tubular glass envelope.

6. A gas discharge laser device as claimed in claim 5 wherein said resilient supporting means includes a plurality of slack springs that form a part of suspension braces operative to position and secure the laser device in a holder.

7. A gas discharge laser device comprising an at least partly tubular glass envelope, a laser tube coaxial with and located within said tubular envelope and containing a lasing gas, a pair of spaced apart mirrors adjacent the ends of the tubular envelope and disposed to form an optical resonator having an optical axis that coincides with the longitudinal axis of the laser tube, a metal sheath at least partly surrounding the glass envelope in good heat transfer relationship therewith and positioned substantially coaxial therewith in a manner so as to provide a substantially uniform heat transfer from the glass envelope to the sheath along substantially the entire length of the laser tube such as to substantially prevent the occurrence of varying temperature gradients in the glass envelope, and means including at least one resilient element for flexibly supporting the metal sheath on the glass envelope in a manner such that a thermally induced deformation of the metal sheath exerts a negligible mechanical influence on the glass envelope.

8. A gas discharge laser device comprising an at least partly tubular glass envelope, a laser tube coaxial with and located within said tubular envelope and containing a lasing gas, a pair of spaced apart mirrors adjacent the ends of the tubular envelope and disposed to form an optical resonator having an optical axis that coincides with the longitudinal axis of the laser tube, a metal sheath having good thermal conductivity at least partly surrounding and coaxial with the tubular envelope and in good heat transfer relationship therewith sufficient to substantially prevent the occurrence of varying temperature gradients along the laser tube, and means including at least one slack resilient element for resiliently supporting the metal sheath around the glass envelope.

9. A gas discharge laser device as claimed in claim 8, wherein the metal sheath comprises a seamless tube section.

10. A gas discharge laser device as claimed in claim 8 wherein the sheath is made of aluminum and is positioned in a manner so as to provide a substantially uniform heat transfer from the glass envelope to the aluminum sheath along substantially the entire length of the laser tube.

11. A gas discharge laser device as claimed in claim 8, wherein said resilient element comprises a readily compressible foamed rubber block located between the outer surface of the glass envelope and an inner surface of the metal sheath.

* * * * *